(12) United States Patent
Li et al.

(10) Patent No.: US 11,977,696 B2
(45) Date of Patent: May 7, 2024

(54) ROLLING GESTURE AND MISTOUCH PREVENTION ON ROLLING DEVICES (71) Applicant: Huawei Technologies Co., Ltd., Shenzhen (CN)

(72) Inventors: Ming Li, Helsinki (FI); Xueqiang Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/799,441

(22) PCT Filed: Feb. 14, 2020

(86) PCT No.: PCT/EP2020/053835
§ 371 (c)(1),
(2) Date: Aug. 12, 2022

(87) PCT Pub. No.: WO2021/160276
PCT Pub. Date: Aug. 19, 2021

(65) Prior Publication Data
US 2023/0109078 A1    Apr. 6, 2023

(51) Int. Cl.
*G06F 3/041* (2006.01)
*H04M 1/02* (2006.01)

(52) U.S. Cl.
CPC .......... *G06F 3/041* (2013.01); *H04M 1/0237* (2013.01); *H04M 1/0268* (2013.01); *G06F 2203/04102* (2013.01); *G06F 2203/04104* (2013.01)

(58) Field of Classification Search
CPC ...... G06F 1/1652; G06F 3/041; G06F 1/1624; G06F 3/04883; G06F 1/1626; G06F 2203/04104; G06F 2203/04102; G06F 2203/04808; H04M 1/0237; H04M 1/0268; H04M 1/0235
See application file for complete search history.

(56) References Cited

U.S. PATENT DOCUMENTS

| 7,268,491 | B2 | 9/2007 | Aksamit et al. | |
| 2011/0010626 | A1* | 1/2011 | Fino | G06F 3/167 345/173 |
| 2013/0314762 | A1* | 11/2013 | Kwack | G09F 9/30 359/280 |
| 2015/0029229 | A1 | 1/2015 | Voutsas | |
| 2016/0378270 | A1 | 12/2016 | Lee et al. | |
| 2017/0031387 | A1 | 2/2017 | Kim | |

(Continued)

FOREIGN PATENT DOCUMENTS

| EP | 3531230 A2 | 8/2019 |
| WO | 2016018300 A1 | 2/2016 |
| WO | 2017112299 A1 | 6/2017 |

*Primary Examiner* — Yaron Cohen
(74) *Attorney, Agent, or Firm* — Slater Matsil, LLP (57) ABSTRACT A method and device for detecting a gesture on a rollable display device for adjusting the display size of the device is provided. The A device includes a housing, a roll unit mounted in the housing and able to be rotatable around a roll axis, a flexible, touch-sensitive display able to detect a touch gesture and to be rolled around the roll unit and defining a planar front screen with a front screen size that changes according to a degree of rotation of the roll unit, and a controller able to, in response to detecting a touch gesture on the front screen, rotate the roll unit to adjust said front screen size.

20 Claims, 3 Drawing Sheets (56) References Cited

U.S. PATENT DOCUMENTS

2018/0364827 A1  12/2018  Chung
2019/0155492 A1   5/2019  Woo et al.
2019/0227703 A1   7/2019  Lee et al.

* cited by examiner

ROLLING GESTURE AND MISTOUCH PREVENTION ON ROLLING DEVICES

CROSS-REFERENCE TO RELATED APPLICATIONS

This application is a National Stage of International Application No. PCT/EP2020/053835, filed on Feb. 14, 2020, which application is hereby incorporated herein by reference in its entirety.

TECHNICAL FIELD

The disclosure relates generally to flexible display devices, more particularly to methods and devices for detecting a gesture on a rollable display device for adjusting the display size of the device.

BACKGROUND

Consumer interest in large and bright display devices and therefore demand for display devices that are conveniently portable and stored is increasing. A flexible display panel provides a solution for portability using a display panel in which a plurality of pixels are disposed on a flexible substrate such as a plastic film instead of a rigid substrate, and thus may be easily bent.

Accordingly, rollable display devices, foldable display devices, and expandable display devices, and the like that use a flexible display panel have been developed. Such rollable display devices comprise a flexible display panel that may be expanded to increase usable screen area and may be rolled in to a compact position to increase portability, using a roll unit for supporting a curved portion of the flexible display panel to be rolled around the roll unit, and a driving module for rotating the roll unit in response to a driving signal. Some rollable display devices include a touch-sensitive flexible display panel that can also function as input device by detecting touch gestures.

A problem with such rollable display devices is however that it is difficult to provide intuitive control options for rolling in and rolling out such a rollable display to adjust screen size. Such control options would traditionally be placed on the side of a device (similarly to audio output volume controls), however the side of the device in rollable display devices forms part of the flexible display panel and is therefore not fixed. Using the touch-sensitive display panel itself for input detection for adjusting the display size further presents a problem of the user accidentally rolling in or rolling out the display by involuntarily touching the display in the dedicated region.

There are several ways in which the aforementioned problems have been attempted to be solved by existing prior art. However, they are still associated with certain disadvantages.

According to one solution, the screen size of a flexible display is adjusted adaptively according to a size of a content (which is selected by the user). In this solution the screen can also be adjusted according to a screen ratio of the content, wherein the screen ratio of the content can be changed by the user using an external device coupled to the display apparatus. In such a case, the user may provide a touch input, a voice input or a motion gesture (for example, by rotation of mobile apparatus) for screen size adjustment. However, the gesture for rolling the rollable display in this case is non-intuitive and indirectly impacts rolling of the rollable display (as the user makes the gesture to select the content, which in turn, suitably rolls the display). Moreover, this solution does not include any measure for avoiding accidental rolling of the rollable display.

According to another solution, multiple user inputs such as touch, taps, gestures may be used to change or manage topology configurations of a dynamic transformable display with integrated touch detection, while the transformable touch display may be rolled or unrolled, for example, to dynamically change the screen size. In this case the user can define, update or modify policies to cause an action (for example, disabling of a portion of the display to avoid inadvertent touch inputs) to occur corresponding to a given topology. However, this solution does not provide any details of the touch gesture that may be provided by the user to change the topology configurations of the transformable display. Moreover, this solution also does not disclose any specific characteristic of a touch gesture that is required to prevent accidental change in topology of the transformable display.

According to further solutions, flexible electronic screens or multi-touch displays can be rolled according to "extension commands" that are supplied as finger, pen, stylus and/or multi-touch inputs from a user, or the rolling and unrolling of the displays can be performed with arm movement.

However, these solutions do not include any details of a specific touch gesture that may be provided by the user to cause rolling of the flexible electronic screen. Moreover, they also do not disclose any specific characteristic of a touch gesture that could be used to prevent accidental rolling of a flexible display.

In addition to the above, there exist several other patent documents such as US20180364827 (LG Electronics Inc), US20160378270A1 (Samsung Electronics Co Ltd), U.S. Pat. No. 7,268,491B2 (Google LLC), which primarily describe manual methods that require a user to apply force to roll and unroll a rollable display.

Thus, a need still exists to provide a solution that enables a user to provide a simple and intuitive input for adjusting rolling in and rolling out on a rollable display device to adjust the front display size of the device, while also avoiding accidental adjustments by involuntarily touching of the display.

SUMMARY

It is therefore an object to provide a method and device for detecting a user gesture on a rollable display for adjusting display size which overcomes or at least reduces the problems mentioned above.

The foregoing and other objects are achieved by the features of the independent claims. Further implementation forms are apparent from the dependent claims, the description and the figures.

According to a first aspect, there is provided a device comprising:
  a housing;
  a roll unit mounted in the housing and configured to be rotatable around a roll axis;
  a flexible, touch-sensitive display configured to detect a touch gesture and to be rolled around the roll unit and thereby define a planar front screen with a front screen size that changes according to a degree of rotation of the roll unit; and
  a controller configured to, in response to detecting a touch gesture on the front screen, cause a rotation of the roll unit to adjust the front screen size.

Detecting a touch gesture on a front screen of a rollable display device provides a simple and intuitive input method for users for adjusting rolling in and rolling out of the display and thereby accommodating different sizes and screen ratios of media content played on the rollable display device, without requiring any special hardware additions to the device. The gesture thus allows for quick rolling of the display without any visual UI element (such as slider toggle, clickable icon, and the like) or physical user interaction element (such as hardware buttons, scrolling wheels, and the like).

In one embodiment the touch gesture comprises a sliding movement of a plurality of touch inputs detected simultaneously or in immediate sequence with respect to each other on the front screen in a same direction, wherein the duration of the entire sequence corresponds to one sliding movement.

In a further embodiment the plurality of touch inputs comprises four or five touch inputs detected simultaneously or in immediate sequence with respect to each other on the front screen in the same direction, wherein the duration of the entire sequence corresponds to one sliding movement.

Limiting the type of touch gesture for adjusting the front screen size to a plurality of simultaneously or in immediate sequence with respect to each other detected touch inputs with a predefined sliding movement enables avoiding accidental adjustments by the user in case of involuntarily touching of the display or simply holding the device.

In a possible implementation form of the first aspect the controller is configured to only detect the touch gesture if the sliding movement is detected substantially perpendicularly to the roll axis, and the distance D of the sliding movement is detected to be greater than half of the length L of the front screen D>0.5 L, wherein the length L is measured perpendicularly to the roll axis. This allows to further limit accidental input and false front screen size adjustments.

In a further possible implementation form of the first aspect the front screen comprises a first edge arranged parallel with and adjacent to the roll unit and a second edge arranged opposite to the first edge, wherein the front screen is configured to be adjusted by the controller between a rolled-in state wherein the front screen size is minimal, and a rolled-out state wherein the front screen size is maximal; and wherein the controller is further configured to
  in response to detecting a the sliding movement in a direction from the first edge towards the second edge, adjust the front screen to a rolled-out state, and
  in response to detecting a the sliding movement in a direction from the second edge towards the first edge, adjust the front screen to a rolled-in state.

This provides further precision in the front screen size adjustments while also ensuring to avoid accidental input.

In a further possible implementation form of the first aspect the controller is further configured to detect a distance D of the sliding movement on the front screen, and adjust the front screen size to various extents between the rolled-in state and the rolled-out state linearly in accordance with the detected distance D.

This additional control allows a user to gradually adjust the front screen size in a level-by-level manner without accidental adjustments.

In a further possible implementation form of the first aspect the controller is further configured to detect a speed S of the sliding movement on the front screen, and adjust a speed of rotation Sr of the roll unit and thereby a roll-in speed or roll-out speed of the display in accordance with the detected speed S of the sliding movement.

This additional control allows a user to adjust the front screen size in a slow or fast pace, thus allowing further control over the display adjustment.

In a further possible implementation form of the first aspect the controller is configured to only detect the touch gesture if it occurs in a marginal area determined within a marginal distance Dm from an upper edge of the front screen or from a lower edge of the front screen, the upper edge or lower edge being perpendicular to the roll axis; wherein the distance is determined so that the marginal area is between 10% and 30% of the area of the front screen, more preferably 20% of the area of the front screen.

This additional limitation of input detection area allows to further avoid accidental front screen size adjustments.

In a further possible implementation form of the first aspect the roll unit further comprises a gear arranged on both ends of the roll unit for engaging the display; and a reversible drive unit configured to rotate the roll unit around the roll axis in response to control signals received from the controller, the control signals comprising instructions defining a direction and an extent of the rotation.

In a further possible implementation form of the first aspect the drive unit is an electric motor configured to further adjust a rotational speed of the roll unit in proportion to an input voltage.

In a further possible implementation form of the first aspect the device is a smart device, preferably a smartphone, and wherein the controller is further configured to provide a user interface on the front screen of the display, the user interface being adjusted in response to adjusting the front screen size.

In a further possible implementation form of the first aspect the controller is further configured to provide at least one visual indicator on the user interface in the form of a movement track showing a required swiping direction and required minimum swiping distance Dmin for the touch gesture to be detected by the controller.

This additional visual feedback allows further avoiding accidental user input and adding precision in the front screen size adjustments, thus ensuring a better user experience.

According to a second aspect, there is provided a method for controlling a rolling display device, the method comprising:
  providing device according to any one of the possible implementation forms of the first aspect, the device comprising roll unit and a flexible, touch-sensitive display configured to detect a touch gesture and to be rolled around the roll unit thereby defining a planar front screen with a front screen size that changes according to a rotation of the roll unit;
detecting a touch gesture of a user on the front screen; and rotating the roll unit in response to the detected touch gesture to adjust the front screen size in accordance with the controller configuration the device.

Detecting a touch gesture on a front screen of a rollable display device provides a simple and intuitive input method for users for adjusting rolling in and rolling out of the display and thereby accommodating different sizes and screen ratios of media content played on the rollable display device, without requiring any special hardware additions to the device. The gesture thus allows for quick rolling of the display without any visual UI element (such as slider toggle, clickable icon, and the like) or physical user interaction element (such as hardware buttons, scrolling wheels, and the like).

These and other aspects will be apparent from and the embodiment(s) described below.

BRIEF DESCRIPTION OF THE DRAWINGS

In the following detailed portion of the present disclosure, the aspects, embodiments and implementations will be explained in more detail with reference to the example embodiments shown in the drawings, in which.

DETAILED DESCRIPTION OF ILLUSTRATIVE EMBODIMENTS

Figure 1:
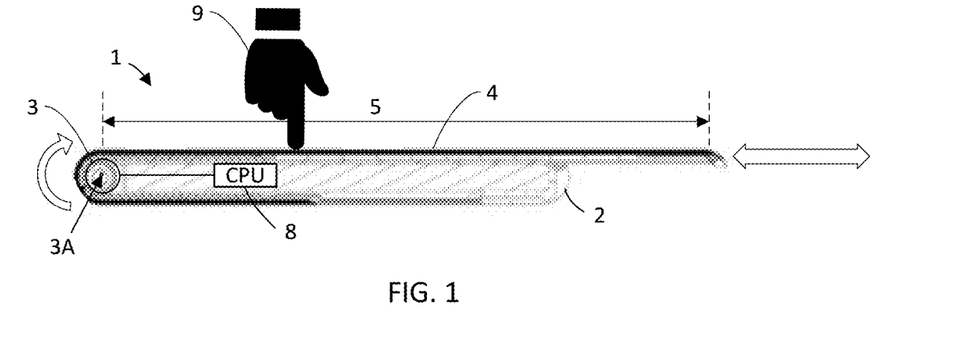
FIG. 1 shows a cross-sectional view of a rolling display device in accordance with an embodiment of the first aspect.

FIG. 1 illustrates a rolling display device 1 in accordance with the present disclosure using a cross-sectional view thereof. Rollable display devices are defined by comprising a flexible display panel that may be expanded by rolling out, around a roll unit that usually comprises one or more gears engaging the flexible display, to increase its usable (front) screen area and may be rolled in to a compact position to increase portability, using the roll unit for supporting a curved portion of the flexible display panel, and a driving module for rotating the roll unit in response to a driving signal.

Rollable display devices may comprise a touch-sensitive flexible display panel that can also function as input device by detecting touch gestures. In some embodiments the touch-sensitive flexible display panels use multi-touch technology that enables the display panels to recognize the presence of more than one point of contact with the screen surface, whereby a multi-touch gesture in this case is made by multiple points of contact (e.g. a finger of a user) touching the rollable touch-sensitive display with or without an accompanying movement of the points of contact (fingers) on the display. These multi-touch gestures help users perform tasks quickly and intuitively on e.g. mobile devices.

The device 1 according to the disclosure comprises a housing 2 and a roll unit 3 rotatably mounted in the housing 2. The device 1 further comprises a flexible, touch-sensitive display 4 configured to detect a touch gesture 9 and also configured to be rolled on the roll unit 3 around a roll axis 3A thereof. As shown in FIG. 1, a curved portion of the display 4 forms a side screen bent around the roll unit 3, and a planar portion of the display 4 forms a front screen 5 facing a user. The size of the front screen 5 thus changes according to a degree of rotation of the roll unit 3. A third, planar portion of the display 4 may form a back screen, wherein the area of the back screen may also change according to a rotation of the roll unit 3.

The device 1 further comprises a controller 8 connected to the roll unit 3 and configured to, in response to detecting a touch gesture 9 on the front screen 5, cause a rotation of the roll unit 3 to adjust the front screen size.

Figure 2:
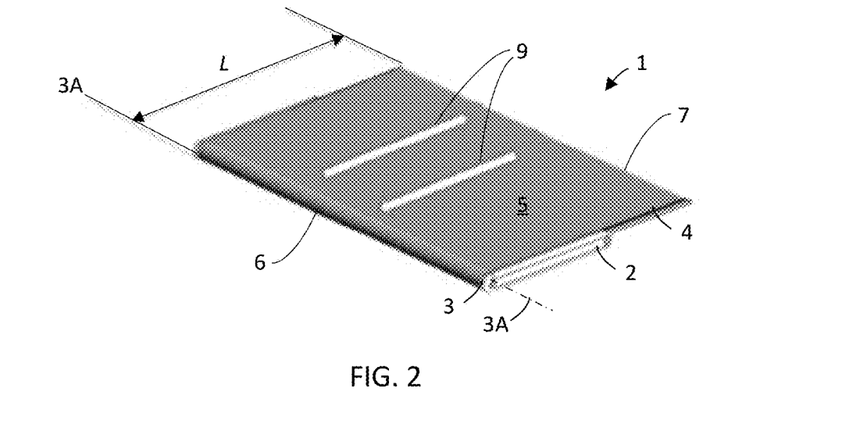
FIG. 2 shows an isometric view of a rolling display device in accordance with an embodiment of the first aspect.

FIG. 2 shows the rolling display device 1 in accordance with the present disclosure in a 3D isometric view, illustrating how the length L of the front screen is measured perpendicular to the roll axis 3A. Features that are the same or similar to corresponding features previously described or shown herein and below are denoted by the same reference numeral as previously used for simplicity.

Figure 3:
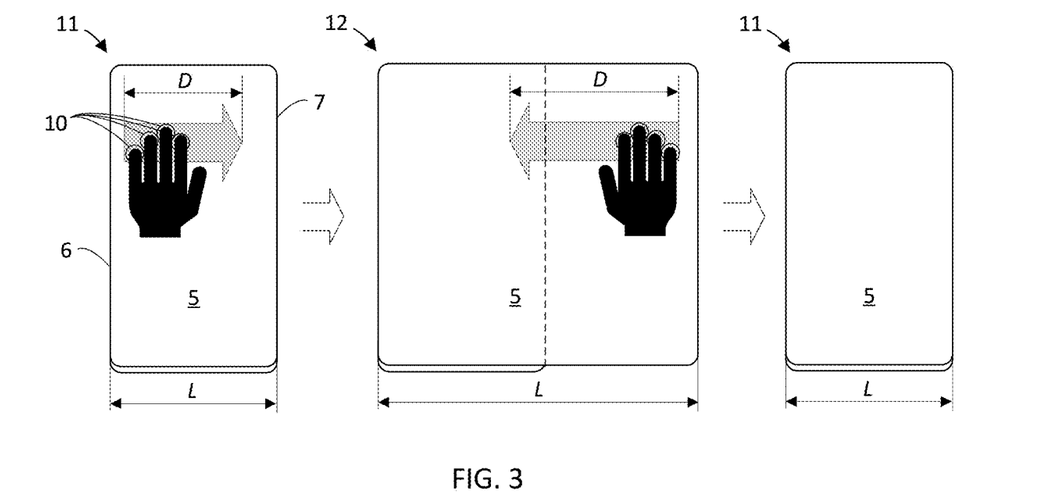
FIG. 3 shows top views of a rolling display device in a rolled-in and rolled-out state in accordance with further embodiments of the first aspect.

In an embodiment as shown in FIG. 2, the touch gesture 9 for adjusting the front screen size of the device 1 comprises a sliding movement on the front screen 5. The touch gesture 9 may comprise a plurality of touch inputs (i.e. a multi-touch gesture) 10 detected simultaneously or in immediate sequence with respect to each other on the front screen 5 in a same direction as shown in FIG. 3. The front screen 5 may comprise a first edge 6 arranged parallel with and adjacent to the roll unit 3 and a second edge 7 arranged opposite to the first edge 6, and the direction of the touch gesture 9 between the first edge 6 and the second edge 7 may determine the rolling direction of the roll unit 3.

FIG. 3 illustrates an embodiment of the device 1 wherein touch gesture 9 comprises four touch inputs 10 detected simultaneously or in immediate sequence with respect to each other on the front screen 5 in a same direction. In a further possible embodiment, the touch gesture 9 may comprise five touch inputs 10 detected simultaneously or in immediate sequence with respect to each other on the front screen 5 in a same direction. Defining such a minimum number of touch inputs allows for avoiding accidental rolling and unrolling of the rollable touch-sensitive display 4 on account of mistouching.

As further illustrated in FIG. 3, the distance D of the sliding movement in these embodiments is defined as the movement distance of the touch inputs 10. In certain embodiments, the controller 8 is configured to only detect the touch gesture 9 if the detected distance D of the sliding movement is greater than half of the length L of the side screen 5, i.e. D>0.5 L. In a further, possibly combined embodiment the controller 8 is further configured to only detect the touch gesture 9 if the sliding movement is detected substantially perpendicularly to the roll axis 3A. This constraint regarding minimum acceptable predefined distance allows for avoiding accidental roll in or roll out of the display 5 on account of mistouching. When the distance moved by the multiple fingers is less than the predefined distance, the gesture 9 is deemed to be invalid and the rollable touch-sensitive display 5 is not rolled in or out.

As illustrated in the figure, the front screen 5 may be configured to be adjusted by the controller 8 between a rolled-in state 11 wherein the front screen size is minimal, and a rolled-out state 12 wherein the front screen size is maximal. In such an embodiment the controller 8 is configured to adjust the front screen 5 to a rolled-out state 12 when detecting a the sliding movement of the touch inputs 10 in a direction from the first edge 6 towards the second edge 7; and further configured to adjust the front screen 5 to a rolled-in state 11 in response to detecting the sliding movement of the touch inputs 10 in a direction from the second edge 7 towards the first edge 6.

This constraint of the bidirectionality of the gesture 9 stems from the fact that users make similar hand movements when opening and closing a sliding door. The user typically moves his/her hand in a required direction of moving the sliding door. Similarly, in the present invention, the user would either move the multiple fingers in the direction of rolling out the display 5 or move the multiple fingers in the direction of rolling in the display 5. Therefore, the described gesture 9 for rolling and unrolling the rollable touch-sensitive display 5 is intuitive. The user need not specially memorize any complex gesture pattern for rolling and unrolling the rollable touch-sensitive display 5. The user can simply move his/her multiple fingers in a required direction of rolling the display 5.

In an embodiment the controller 8 may be further configured to, after detecting a distance D of the sliding movement on the front screen 5, adjusting the front screen size to various extents between the rolled-in state 11 and the rolled-out state 12 linearly in accordance with the detected distance D.

In an embodiment the controller 8 may be further configured to, after detecting a speed S of the sliding movement on the front screen 5, adjusting a speed of rotation Sr of the roll unit 3 and thereby a roll-in speed or roll-out speed of the display 4 in accordance with the detected speed S of the sliding movement.

Figure 4:
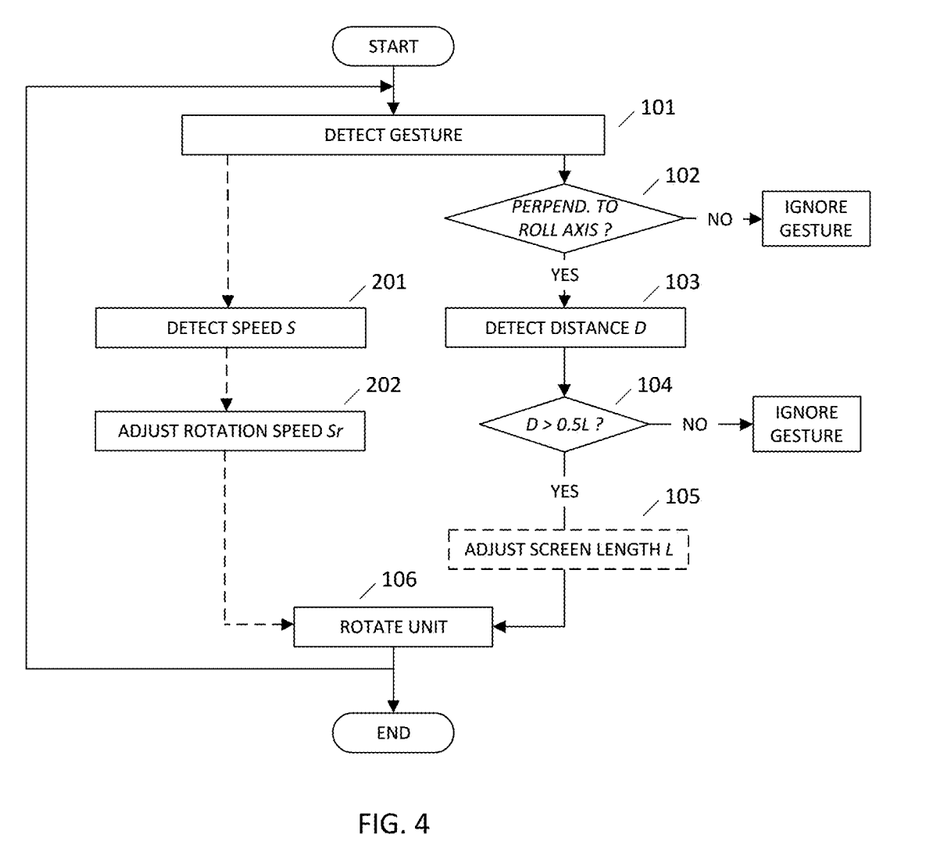
FIG. 4 shows a flow diagram illustrating the functioning of a rolling display device in accordance with different embodiments of the second aspect.

FIG. 4 shows a flow diagram illustrating the functioning of the rolling display device according to the above described configurations of the controller 8, which can be implemented separately or combined as one controller 8 configuration.

In a first step 101 a predefined (multi-)touch gesture 9 is detected on the front screen 5 as described above. In some embodiments at least 2 simultaneous touch inputs 10 need to be detected for a valid touch gesture 9. In further possible embodiments at least 3, 4 or 5 simultaneous touch inputs 10 need to be detected for a valid touch gesture 9. In other words, in order to roll or unroll the rollable touch-sensitive display 4, a user is required to tap the front screen 5 using multiple fingers and move (slide) the multiple fingers across the front screen 5. Such a tapping and moving gesture is also commonly referred to as "Swiping". The gesture 9 can thus be understood to be a multi-finger swipe gesture. This gesture requiring multiple fingers is rarely used on smart devices, and is therefore quite unique.

In a next step 102 the controller 8 determines whether the sliding movement of the touch inputs 10 was detected substantially perpendicularly to the roll axis 3A, and the (multi-)touch gesture 9 is ignored in any other case to prevent accidental roll-in or roll-out of the display 4.

In a next step 103 the distance D of the detected sliding movement of the touch inputs 10 is detected, after which the controller 8 compares 104 the detected distance D with the actual length L of the side screen 5 and only interprets the gesture 9 as valid if the distance D of the sliding movement is greater than half of the length L of the front screen 5 (D>0.5 L), otherwise the gesture 9 is ignored.

Accordingly, in a preferred embodiment, only when the above 3 constraints are satisfied (number of touch inputs, sliding direction and distance) are the given touch inputs 10 deduced to be a valid touch gesture 9 for controlling rolling of the rollable touch-sensitive display 4.

In an embodiment as described above, the controller 8 may be further configured to adjust 105 the front screen size to various extents between the rolled-in state 11 and the rolled-out state 12 linearly in accordance with the detected distance D (for example, 60% rolled-out state, 75% rolled-out state, 80% rolled-out state, and so on).

According to another possible embodiment, the length L of the side screen 5 (and thus the front screen size) is gradually increased or decreased in a level-by-level or step-wise manner, whereby a step-wise adjustment refers to increasing or decreasing the length L of the side screen 5 by one or more predefined levels between a minimum length (rolled-in state 11) and a maximum length (rolled-out state 12).

Accordingly, in a final step 106 the roll unit 3 is rotated in response to the detected touch gesture 9 to adjust the front screen size in accordance with the controller 8 configuration the device 1 as explained above.

In a possible embodiment, as shown also in FIG. 4, the controller 8 is further configured to detect 201 a speed S of the sliding movement on the front screen 5, and adjust 202 a speed of rotation Sr of the roll unit 3 and thereby a roll-in speed or roll-out speed of the display 4 in accordance with the detected speed S of the sliding movement.

Figure 5:
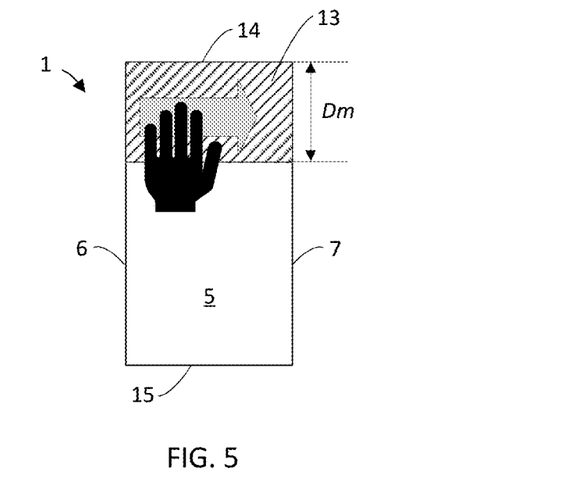
FIG. 5 shows a top view of a rolling display device illustrating a marginal area in accordance with another embodiment of the first aspect.

FIG. 5 illustrates a further embodiment of the device 1 which can be implemented separately or combined as one controller configuration. In this embodiment the controller 8 is configured to only detect the touch gesture 9 if it occurs in a marginal area 13 determined within a marginal distance Dm from an upper edge 14 of the front screen 5 or from a lower edge 15 of the front screen 5, the upper edge 14 or lower edge 15 being perpendicular to the roll axis 3A. In a possible embodiment, the marginal distance Dm is determined so that the marginal area 13 is between 10% and 30% of the area of the front screen 5, more preferably 20% of the area of the front screen 5.

Figure 6:
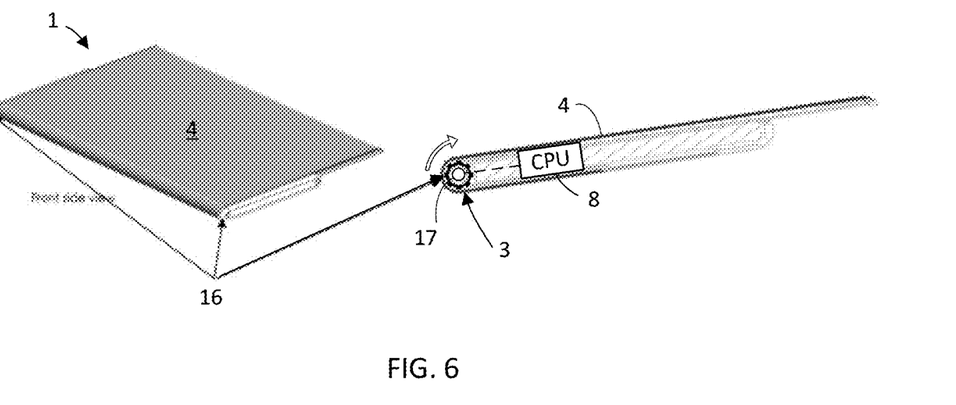
FIG. 6 shows different views illustrating the gear and drive unit of a rolling display device in accordance with another embodiment of the first aspect.
Figure 7:
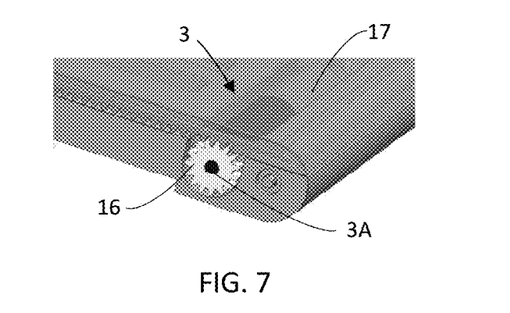
FIG. 7 shows a 3D side view illustrating the gear and drive unit of a rolling display device from another angle, in accordance with an embodiment of the first aspect.

FIGS. 6 and 7 illustrate further embodiments of the rolling display device 1, wherein the roll unit 3 further comprises a gear 16 arranged on both ends of the roll unit 3 for engaging the display 4 and a reversible drive unit 17 configured to rotate the roll unit 3 around the roll axis 3A in response to control signals received from the controller 8, the control signals comprising instructions defining a direction and an extent of the rotation. Such a reversible drive unit 17 (motor) is capable of providing bidirectional rotational motion to the rollable touch-sensitive display 4. The reversible drive unit 17, gears 16 and gear shaft together form a rolling mechanism (roll unit 3) of the rollable touch-sensitive display 5. The drive unit 17 can be controlled by giving signals to have two-way rotation with high precision (up to millimeter precision). Higher the voltage given to the drive unit 17, faster is the movement of the gear shaft, which drives the rollable display 4 to roll faster. Moreover, rolling orientation, moving distance, and rolling speed can be controlled by the giving right signals to the reversible drive unit 17.

In a possible embodiment, the drive unit 17 is an electric motor configured to further adjust a rotational speed of the roll unit 3 in proportion to an input voltage.

Figure 8:
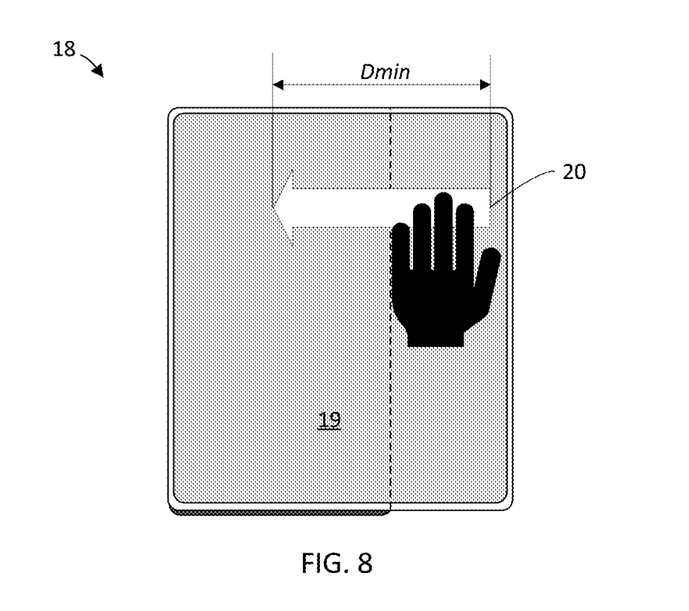
FIG. 8 shows a top view illustrating a visual indicator on a user interface of a rolling display device in accordance with another embodiment of the first aspect.

In a possible embodiment as shown in FIG. 8, the device 1 is a smart device, preferably a smartphone 18. The controller 8 of such embodiments may further configured to provide a user interface 19 on the front screen 5 of the display 4, the user interface 19 being adjusted in response to adjusting the front screen size. In further optional embodiments, the rollable touch sensitive display could be a part of other smart devices such as smart televisions, smart watches, and the like.

According to a possible embodiment, the controller 8 may further configured to provide at least one visual indicator 20 on the user interface 19 in the form of a movement track showing a required swiping direction and required minimum swiping distance Dmin for the touch gesture 9 to be detected by the controller 8. The visual indicator 20 may be displayed when at least 2 fingers of a user touch the display, and the length of the visual indicator 20 may be selected to be slightly larger than half the length (>0.5 L) of the front screen 4. Thus, when the user moves his/her fingers along an entire length of the visual indicator 20, they would automatically satisfy the constraints defined above. This is also useful in that the user need not worry about estimating a required movement distance Dmin according to the current screen length L. Since a controller 8 would be able to determine the current screen length L, it can compute the predefined distance Dmin and display a visual indicator 20 of suitable length on the surface of the rollable touch-sensitive display 4.

In a further possible embodiment, when a user touches (taps) a surface of the touch-sensitive rollable display 4 with multiple fingers, separate virtual movement tracks for each finger of the user may be displayed on the display 4. These movement tracks would act as a guidance for the user, in that the user may simply move (namely, swipe) his/her fingers along the movement tracks to roll the display 5.

In a further alternative embodiment, a modification of the gesture 9 could optionally be performed for rollable displays that are not touch-sensitive. In such a case, a modified gesture defined by constraints such as described above, could be made by a user in air, and within a predefined separation distance from a surface of the rollable display 4.

The various aspects and implementations has been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

The reference signs used in the claims shall not be construed as limiting the scope.

The invention claimed is:

1. A device comprising:
   a housing;
   a roll unit mounted in the housing and configured to be rotatable around a roll axis;
   a flexible, touch-sensitive display configured to detect a touch gesture and to be rolled around said roll unit and thereby define a planar front screen with a front screen size that changes according to a degree of rotation of said roll unit; and
   a controller configured to, in response to detecting a touch gesture on the front screen, rotate said roll unit to adjust said front screen size, wherein said touch gesture is only detected in response to a sliding movement substantially perpendicular to said roll axis, wherein a distance D of said sliding movement is greater than half of a length L of said front screen, D>0.5 L, wherein said length L is measured perpendicularly to said roll axis.

2. The device according to claim 1, wherein said touch gesture comprises the sliding movement of a plurality of touch inputs detected simultaneously or in immediate sequence with respect to each other on said front screen in a same direction.

3. The device according to claim 2, wherein said plurality of touch inputs comprises four or five touch inputs detected simultaneously or in immediate sequence with respect to each other on said front screen in the same direction.

4. The device according to claim 3:
   wherein said front screen comprises a first edge arranged parallel with and adjacent to said roll unit, and a second edge arranged opposite to said first edge;
   wherein said front screen is adjustable by said controller between a rolled-in state wherein said front screen size is minimal, and a rolled-out state wherein said front screen size is maximal; and
   wherein the controller is further configured to:
      adjust, in response to detecting a said sliding movement in a direction from said first edge towards said second edge, said front screen to a rolled-out state, and
      adjust, in response to detecting a said sliding movement in a direction from said second edge towards said first edge, said front screen to a rolled-in state.

5. The device according to claim 4, wherein said controller is further configured to:
   detect said distance D of said sliding movement on said front screen; and
   adjust said front screen size to various extents between said rolled-in state and said rolled-out state linearly in accordance with said detected distance D.

6. The device according to claim 5, wherein said controller is further configured to:
   detect a speed S of said sliding movement on said front screen; and
   adjust a speed of rotation Sr of said roll unit and thereby a roll-in speed or roll-out speed of said display in accordance with said detected speed S of said sliding movement.

7. The device according to claim 6, wherein said controller only detects said touch gesture if it occurs in a marginal area determined within a marginal distance Dm from an upper edge of said front screen or from a lower edge said the front screen, wherein said upper edge or lower edge is perpendicular to said roll axis, and wherein said marginal distance is determined so that the marginal area is between 10% and 30% of the area of said front screen.

8. The device according to claim 1, wherein said roll unit further comprises:
   a gear arranged on both ends of said roll unit for engaging said display; and
   a reversible drive unit which rotates said roll unit around said roll axis in response to control signals received from said controller, wherein said control signals define a direction and an extent of said rotation.

9. The device according to claim 8, wherein said drive unit is an electric motor which adjusts a rotational speed of said roll unit in proportion to an input voltage.

10. The device according to claim 1, wherein said device is a smart device, wherein said controller provides a user interface on said front screen of said display, and wherein said user interface is adjusted in response to adjusting said front screen size.

11. The device according to claim 10, wherein said controller provides at least one visual indicator on said user interface in the form of a movement track showing a required swiping direction and required minimum swiping distance Dmin for said touch gesture to be detected by said controller.

12. A method for controlling a rolling display device, the method comprising:
- detecting a touch gesture of a user on a front screen of said rolling display device; and
- rotating a roll unit in response to said detected touch gesture to adjust said front screen size in accordance with a controller configuration of the device;
- wherein said rolling display device comprises a flexible touch-sensitive display and said roll unit;
- wherein said flexible touch sensitive display is able to be rolled around said roll unit thereby defining a front screen size that changes according to a rotation of said roll unit; and
- wherein said touch gesture is only detected in response to a sliding movement substantially perpendicular to a roll axis of the roll unit, wherein a distance D of said sliding movement is greater than half of a length L of said front screen, D>0.5 L, wherein said length L is measured perpendicularly to said roll axis.

13. The method according to claim 12, wherein said touch gesture comprises the sliding movement of a plurality of touch inputs detected simultaneously or in immediate sequence with respect to each other on said front screen in a same direction.

14. The method according to claim 13, wherein said plurality of touch inputs comprises four or five touch inputs detected simultaneously or in immediate sequence with respect to each other on said front screen in the same direction.

15. The method according to claim 14, wherein said front screen comprises a first edge arranged parallel with and adjacent to said roll unit, and a second edge arranged opposite to said first edge, wherein said front screen is adjustable by said controller between a rolled-in state wherein said front screen size is minimal, and a rolled-out state wherein said front screen size is maximal, and wherein the method further includes:
- adjusting, in response to detecting a said sliding movement in a direction from said first edge towards said second edge, said front screen to a rolled-out state, and
- adjusting, in response to detecting a said sliding movement in a direction from said second edge towards said first edge, said front screen to a rolled-in state.

16. The method according to claim 15, wherein the method further includes:
- detecting said distance D of said sliding movement on said front screen; and
- adjusting said front screen size to various extents between said rolled-in state and said rolled-out state linearly in accordance with said detected distance D.

17. The device according to claim 16, wherein the method further includes:
- detecting a speed S of said sliding movement on said front screen; and
- adjusting a speed of rotation Sr of said roll unit and thereby a roll-in speed or roll-out speed of said display in accordance with said detected speed S of said sliding movement.

18. The method according to claim 17, wherein said touch gesture is only detected further in response to said sliding movement if the touch gesture occurs in a marginal area determined within a marginal distance Dm from an upper edge of said front screen or from a lower edge said the front screen, wherein said upper edge or lower edge is perpendicular to said roll axis, and wherein said marginal distance is determined so that the marginal area is between 10% and 30% of the area of said front screen.

19. The method according to claim 12, wherein said roll unit further comprises a gear arranged on both ends of said roll unit for engaging said display, and a reversible drive unit, and wherein the method further comprises:
- rotating said roll unit around said roll axis in response to control signals, wherein said control signals define a direction and an extent of said rotation.

20. The method according to claim 19, wherein the method further includes:
- adjusting a rotational speed of said roll unit in proportion to an input voltage.

* * * * *

UNITED STATES PATENT AND TRADEMARK OFFICE
CERTIFICATE OF CORRECTION

PATENT NO. : 11,977,696 B2
APPLICATION NO. : 17/799441
DATED : May 7, 2024
INVENTOR(S) : Li et al.

It is certified that error appears in the above-identified patent and that said Letters Patent is hereby corrected as shown below:

In the Claims

In Column 10, in Claim 7, Line 44, delete "edge said the" and insert -- edge of said --.

In Column 12, in Claim 17, Line 13, delete "device" and insert -- method --.

In Column 12, in Claim 18, Line 25, delete "edge said the" and insert -- edge of said --.

Signed and Sealed this
Eighth Day of October, 2024

Katherine Kelly Vidal
*Director of the United States Patent and Trademark Office*